June 14, 1949.　　　C. G. HEBEL ET AL　　　2,473,282
LIQUID CONTROL GEAR

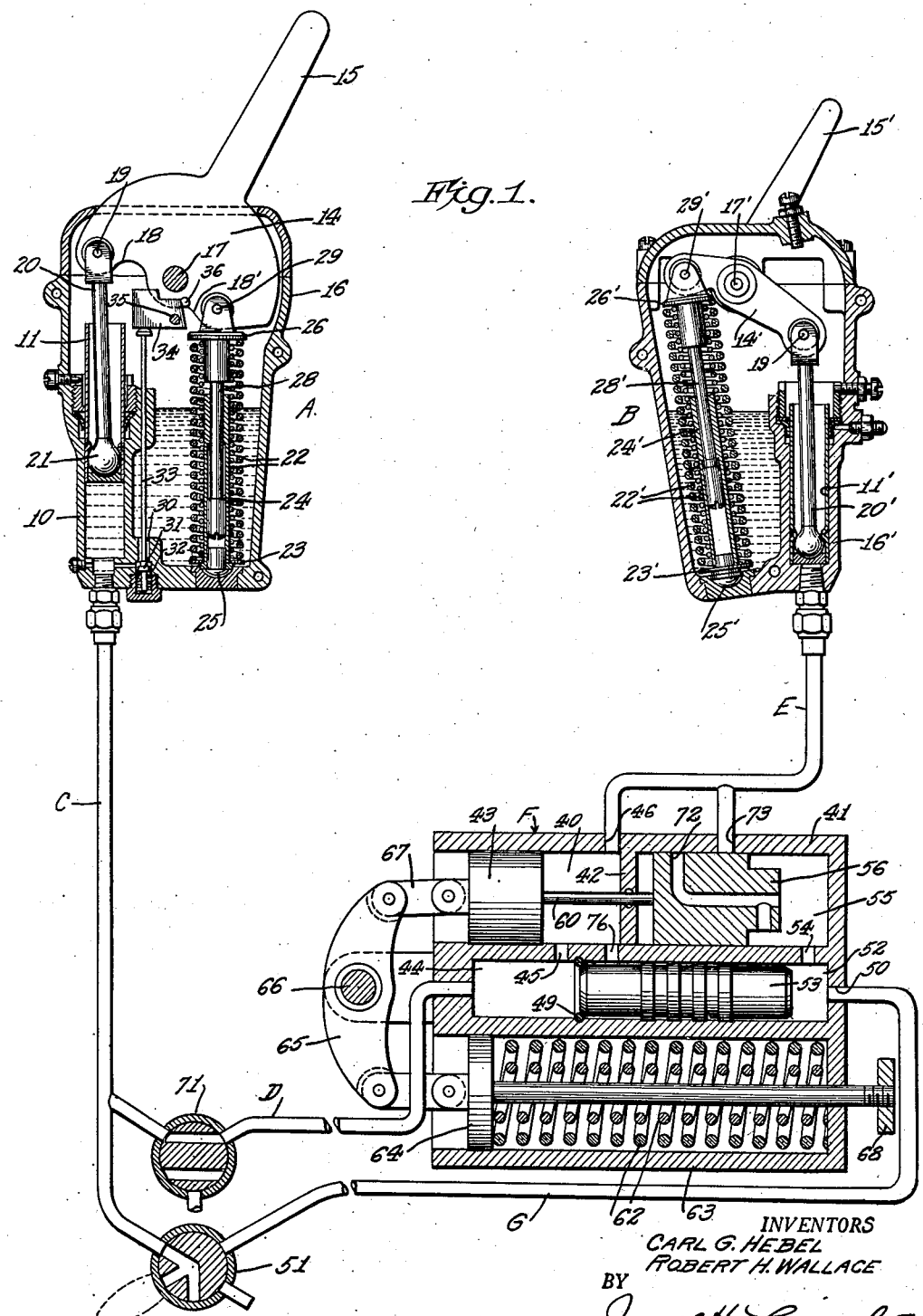

Filed March 7, 1944　　　　　　　　　　　2 Sheets-Sheet 2

INVENTORS
CARL G. HEBEL
ROBERT H. WALLACE
BY
Joseph H. Lipschutz
ATTORNEY

Patented June 14, 1949

2,473,282

UNITED STATES PATENT OFFICE 2,473,282

LIQUID CONTROL GEAR

Carl G. Hebel, Weehawken, N. J., and Robert H. Wallace, Central Nyack, N. Y., assignors to Sperry Products, Inc., Hoboken, N. J., a corporation of New York Application March 7, 1944, Serial No. 525,344

9 Claims. (Cl. 60—54.5)

1

This invention relates to liquid control gear of the type wherein movement of a member at a transmitting station is caused to control movement of a member at a receiving station. More particularly, this invention relates to control gear of this type wherein the transmitting and receiving stations are connected by a liquid transmission system. One such system is shown in the patent to H. S. Hele-Shaw and T. E. Beacham, No. 1,983,884, granted December 11, 1934, in which the object is to apply a constant force to the fluid system at the transmitting end and to receive a corresponding constant force at the receiving end. Another such system is shown in the patent to Alfred N. Lawrence, No. 2,197,554, granted April 16, 1940, for Liquid control gear, in which the object consists in applying a constantly increasing force at the transmitting end to overcome a constantly increasing load at the operated or receiving end. In either of the aforementioned cases, the operating and operated members will retain any position into which they may be moved without any tendency on their part to return to a centralized position.

In this type of transmission system a problem arises due to the fact that the fluid in the transmission system changes its temperature, particularly at the receiving end, due to the operation of the mechanism at that end, and such change is at a greater rate than that of the pipe in which the transmitting fluid is contained. As a result, the parts at the receiving end are operated through a predetermined degree greater or less than the operation which has been transmitted thereto by the transmitting end. Thus, for instance, it has been found in cases where the receiving end is employed to operate a variable pitch propeller mechanism under control of a governor, that the temperature variation due to heating up of the fluid at the receiving end has caused variation in engine speed up to 200 R. P. M.

It is therefore one of the principal objects of this invention to provide a transmission system of the type described wherein the relationship between the transmitter and the receiver will not be affected by temperature variations. For this purpose there is provided in the connection between the transmitting station and the receiving station a temperature compensating means providing for automatic variation of the volumetric capacity of the said connection in accordance with temperature variations. These variations in volumetric capacity are designed to be exactly sufficient to take care of the increase or decrease of volume of the fluid in the transmission system.

It is a further object of this invention to provide in connection with the temperature compensating means mentioned in the foregoing paragraph, an emergency connection which is designed to connect the transmitting station and the receiving station in the event that the main connection fails.

It is a further object of this invention to provide temperature compensating means of the type mentioned above which does not prevent operation of the liquid control system in the event that the temperature compensator fails by reason of the breaking of the emergency line.

Further objects and advantages of this invention will become apparent in the following detailed description thereof.

In the accompanying drawings,

Fig. 1 is an assembly view, with parts sectioned vertically, of a liquid control gear embodying our invention.

Figure 3:
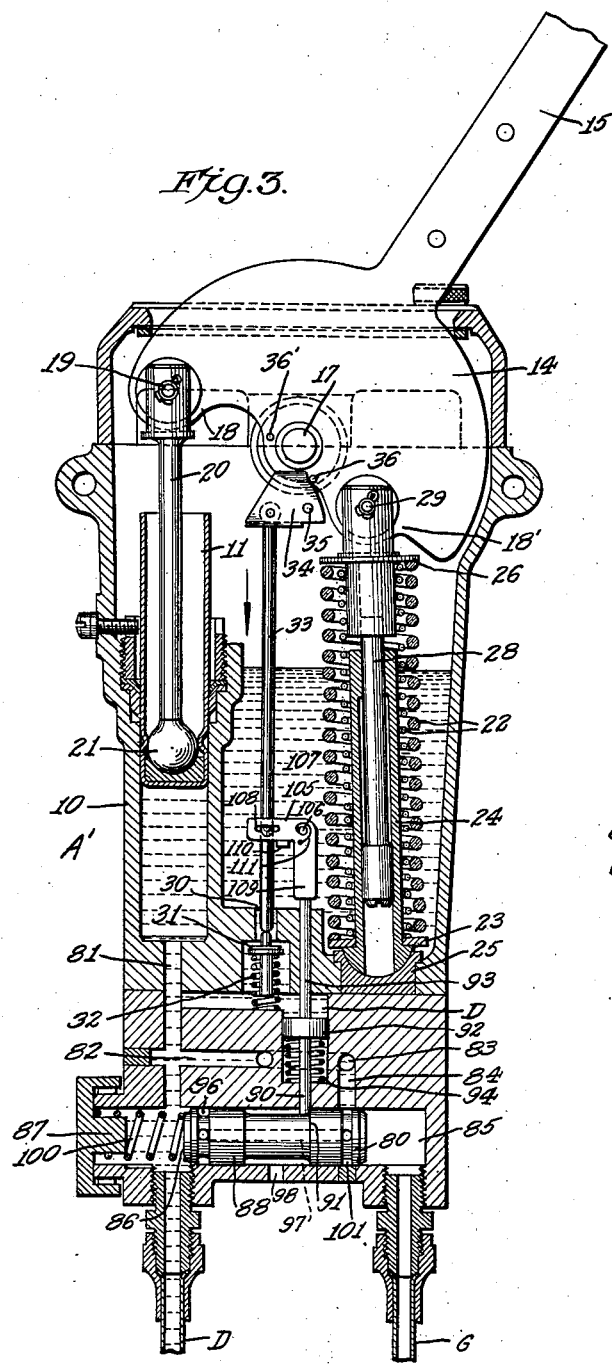
Fig. 3 is a view of a transmitter assembly showing a modification of the form disclosed in Fig. 1.
Figure 2:
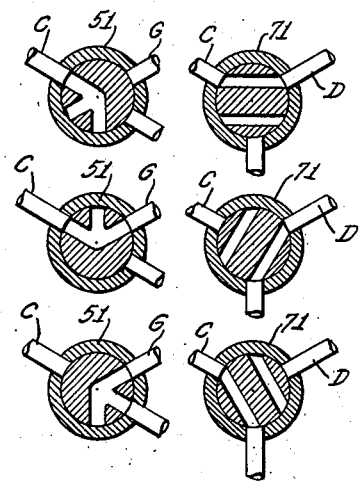
Fig. 2 is a diagrammatic detail showing other operating positions of the compound valve employed in Fig. 1.

Referring to the drawings, it will be seen that this invention comprises three main parts, namely a transmitting station A, a receiving station B, and a force transferring connection which may comprise a plurality of ducts C, D and E with a temperature compensating means indicated generally at F interposed in said line. The connections C, D, F, E are filled with liquid so that force applied at one end of the liquid column at C will cause said column to move through the connections to operate a member at the outer end of duct E. For applying forces to the liquid column for the purpose of transmitting forces, there may be provided a cylinder 10 within which operates a piston 11. Said cylinder is connected at one end to the duct C which is filled with liquid extending up to said piston. For operating the said piston in a direction to transmit force to the liquid column, there may be provided a transmitting element in the form of a lever 14 pivoted within the casing 16 on a pivot 17, and having an operating handle 15 and the lever or crank arms 18 and 18'. The crank arm portion 18 is pivotally connected at 19 to the upper end of a piston rod 20 pivotally connected to the piston at 21. As the handle is moved in the direction of the arrow, the piston is lowered to cause the column of liquid to move through the duct C, The force which is applied to the piston is determined by one or more loading springs 22 seated at one end against the bracket 23 fixed upon the sleeve 24 pivoted at 25. The other ends of said loading springs bear against a bracket 26 fixed to a rod 28 which operates within the sleeve member 24. The springs are under compression and apply the operating force to the lever arm 18' by way of the pivotal connection 29 between the upper end of rod 28 and the operating lever 14. The distance between the center of pivot 17 and the center of pivot 29 forms the crank arm 18' through which the force is applied. The positions of the springs and their connections are such that the springs act through a small lever arm to apply a relatively light loading force to crank arm 18 and the piston 11 when the piston is in its uppermost position, but as the handle 15 is actuated in the direction of the arrow, it will be seen that the springs act through an increasing lever arm. At the same time, however, the springs are extended so that while they act through a larger lever arm they apply a decreasing force to said arm as the latter increases. The design of the various parts may be made such that the rate of decrease of the compressive force of the springs is equal to, or slower than, the rate of increase of the lever arm as handle 15 is actuated in the direction of the arrow, depending upon the purpose to which the device is to be put, that is, whether the product of these two factors should be a constant to yield a constant loading force, or whether said product shall yield a continuously increasing loading force. In either case the force which an operator applies to handle 15 is constant in spite of the increasing force on the piston and need only be sufficient to overcome friction in the system. The operation of handle 15 at the transmitting station just described to move piston 11 inwardly in its cylinder will cause an element at the receiver end, such as piston 11', to be moved outwardly in its cylinder and cause a piston rod 20' connected to said piston to actuate a lever 14' pivoted at 17'. The piston rod 20' is pivotally connected to one end of lever 14' at 19' and said lever 14' is pivotally connected at its other end at 29' to a two-part extensible member 24', 28' pivoted at its other end at 25' in the casing 16', the said two-part element 24', 28' being similar to the element 24, 28 at the transmitting end. The two parts similarly hold between brackets 23' and 26' a set of compression springs 22' similar to springs 22. The distances between pivot 17' and pivot 19' and between 17' and 29' are the same as between pivot 17 and pivots 19 and 29. Thus it will be seen that the relationship of the parts at the transmitter and receiver are the same but in inverse order, and therefore a force transmitted by movement of piston 11 will produce an equal movement of piston 11'. An operating member or handle 15' fixed to move with lever 14' will therefore move in parallel relationship to handle 15 in whichever position handle 15 is placed.

The casing 16 is provided with a liquid reservoir in order to maintain the transmission system filled. The leakage from said system may be replenished by connecting the said cylinder by way of passage 30 and valve 31 to the liquid within the casing 16. This may be done by depressing said valve 31 against the action of spring 32 by means of a rod 33 fixed to said valve, said rod being adapted to be engaged by means of a crank 34 pivoted at 35, said crank being actuated by a pin 36 when the piston 11 is in its uppermost position. At this time the engagement of pin 36 rocks the bell crank 34 around its pivot 35 to cause it to engage rod 33 and open valve 31 to permit liquid from the reservoir to enter the cylinder 10.

When there is variation of temperature which may affect the fluid in the transmission system, the liquid will tend to expand or contract, and thus operated member 15' will tend to change its relationship with respect to operating member 15. An error in the transmission system is thus introduced and, as stated hereinbefore, where the operated member 15' is a governor control it has been found that such temperature variations may cause variations in the engine speed of as high as 200 R. P. M. The problem therefore consists in devising a system whereby the variations in temperature of the fluid in the transmission system will not affect the relationship of the operating and operated elements. For this purpose we have provided the following solution:

In the fluid connection C, D, E there is interposed the temperature compensator F designed to provide a variable volumetric capacity to the fluid connection in response to temperature changes, and to a degree corresponding to the amount of contraction or expansion of the fluid in the system. The variable volumetric capacity is supplied by means of a variable chamber 40 formed within the casing 41 of the temperature compensator. Said chamber 40 has a fixed wall 42 at one end and a movable piston 43 at the other, so that the position of the piston defines the size of the chamber. The duct D communicates with chamber 40 by way of a chamber 44 and port 45 while the duct E communicates with chamber 40 through port 46. The fluid connection from transmitting station A to receiving station B therefore includes the ducts C and D, chamber 44, port 45, variable chamber 40, port 46 and duct E.

It will now be seen that if the variable chamber 40 could have its volume varied in one direction or the other corresponding to the total increase or decrease in volume of the liquid in the force transmitting connection between A and B, there would be no undesired operation of either the transmitter handle or the receiver element in response to temperature variations. To accomplish this result we provide an auxiliary fluid connection G extending from a port 50 in the compensator housing 41 to a valve 51 which connects the other end of the line G to the duct C. The valve 51 is normally positioned so as to disconnect the line G from duct C. The other end of line G enters the housing 41 through port 50 into a chamber 52 in which is positioned a piston 53 normally abutting against a stop 49, and thence by way of a port 54 into a chamber 55 in which operates a piston 56. The volume of fluid in line G, chamber 52, port 54 and chamber 55 is made equal to the volume of fluid in the duct C, duct D, chamber 44, port 45, chamber 40 and duct E. Furthermore, the line G is drawn substantially parallel to the duct D and therefore will partake of substantially the same variations in temperature. It follows that the expansion or contraction of the liquid in the compensator line G and its connected chambers will be substantially the same as that in the main line connection through C, D and E.

Expansion or contraction of the liquid in the compensator line is caused to vary the volume of chamber 40 sufficiently to take up the expansion or contraction in the main connection by reason of the fact that pistons 43 and 56 are rigidly connected by means of a rod 60. Thus, when the fluid in the compensator line expands, piston 56 will be moved to the left to move piston 43 to the left, and thus increase the volume of chamber 40 by an amount equal to the expansion of the liquid in line C, D, E because the liquid in said main line C, D, E is equal in volume to the liquid in compensator line G. Similarly, when contraction occurs due to lowering of temperature, the liquid in line G contracts and enables a spring system 62 housed within a chamber 63 to force piston 64 to the left and operate a lever 65 around its pivot 66 to move piston 43 to the right by reason of its connection 67 to said lever. Thus, the volume of chamber 40 is diminished, and to the extent exactly equal to the reduction in volume in main line C, D, E because such reduction is equal to that of the liquid in compensator line G. The springs 22 and 22' maintain the fluid in the main line C, D, E under a predetermined pressure, but the spring assembly 62 is designed to exert a pressure on piston 43 far in excess of any pressures encountered in the system due to operation under normal loads. In other words, the compensator piston 43 cannot be moved to vary the volume of chamber 40 by the pressure in the fluid transmission system due to operating under any loads within the rated output of the liquid control gear. Since compensator line G is closed at one end by the valve 51, there is an incompressible body of fluid at the right end of piston 56 which holds it against any movement except that due to contraction or expansion of the fluid in the compensator system. The tension of the spring system 62 may be adjusted in any suitable manner, as by means of a threaded nut 68.

The above described temperature compensation system can be utilized to provide an alternative emergency fluid connection between transmitting station A and receiving station B in the event that the main duct D fails. It will be understood that D provides the principal length of duct between stations, the temperature compensator F being located adjacent the receiving station, and the duct C being of relatively short length adjacent the transmitting station. For this purpose, the compensator duct G may be utilized by providing suitable connections at its ends to the duct C and the duct E respectively. The connection to the duct C may be accomplished manually by the operator when he realizes that the duct D has been broken, and for this purpose a valve 71 may be operated to disconnect the duct D from duct C while at the same time valve 51 may be operated to connect one end of compensator duct G to the duct C.

The other end of compensator duct G may be connected to duct E automatically when valve 51 is operated to connect compensator G to duct C. When this occurs, the fluid contained in chamber 55, port 54, chamber 52, port 50, and compensator duct G, is no longer an incompressible body of fluid, but is now connected to duct C and hence to the transmission system. The pressure of spring system 62 may therefore operate the piston 43 to the right to close port 45 and to move piston 56 to the right and displace the fluid from chamber 55 until a port 72 in piston 56 registers with a port 73 leading to duct E. That is, communication is established from duct E through port 73, port 72, port 54, chamber 52, port 50, compensator duct G, valve 51, duct C to the transmitting station, and by duct E to the receiving station. Thus, a fluid connection has been established by way of compensator G with original main duct D cut out. Under these conditions, the liquid control gear may operate to transmit movement, but obviously the temperature compensation system no longer functions. The liquid control gear is now under emergency operation, and for the period of such operation it will be subject to whatever temperature errors may be introduced.

While duct D functions, and the compensator system is effective, that is, with valve 71 connecting duct D to duct C, and valve 51 disconnecting duct G from duct C, in other words, with the parts as shown in Fig. 1, it may occur that the duct G will fail. Under these circumstances provision is made whereby the system will be operated as a liquid control gear to transmit motion from station A to station B, but without the benefit of temperature compensation. In other words, failure of the temperature compensator will not interfere with the operation of the force transmitting system. To make this effective, it will be seen that failure of duct G would release the pressure in chamber 55 and permit the spring system 62 to move piston 43, and hence piston 56 to the right. When piston 56 strikes the wall of chamber 55, piston 43 will stop just short of port 46 and port 76 in the same plane. Since the pressure has dropped in chamber 52, the pressure of the liquid control system in chamber 44 will be sufficient to operate piston 53 to the right to close port 54 and open port 76. Closure of port 54 will disconnect duct E and port 72 from duct G. Duct E will be able to communicate with chamber 44 through duct 46 and port 76, duct 45 having been closed by the movement of piston 43 to the right. Thus, the fluid connection is maintained between the transmitting station and the receiving station through duct C, valve 71, duct D, chamber 44, port 76, chamber 40, port 46, and duct E, even though the pressure in the compensator duct G has failed. Therefore, normal operation of the liquid control gear is possible, without, however, receiving the benefit of temperature compensation.

Heretofore there has been described a system where, upon failure of the main duct D, compensating line G acting as an emergency line is automatically connected at the receiver end into the main transmission line and is connected into this same line at the transmitter end by hand operation of valves 51 and 71. By valve 71 duct D is disconnected, and by valve 51, duct G is connected into the main transmission line between A and B. In Fig. 3 there is disclosed a system whereby line G may be automatically connected at both ends into the main line connection between A and B upon failure of main duct D.

For this purpose, a modified form of transmitter A' is substituted for transmitter A of Fig. 1. Instead of the transmitter casing being connected to lines D and G, as shown in Fig. 1 by way of valves 51 and 71 outside of the case, in the Fig. 3 form the fluid in cylinder 10 is connected to the lines D and G by way of a valve structure incorporated into the casing of the transmitter in the lower portion thereof. The upper portion of transmitter A' is similar in all respects to the mechanism in transmitter A, and similar parts are similarly numbered. The valve structure which takes the place of valves 51 and 71 in the lower portion of the transmitter casing comprises a slide valve 80 which normally is positioned to provide communication between cylinder 10 and duct D, while cutting off communication between cylinder 10 and duct G. This normal position of valve 80 is shown in Fig. 3 wherein it will be seen that the passage 81 from cylinder 10 is in open direct connection with the duct D, whereas, the connection between cylinder 10 and duct G, which normally comprises passage 81, passage 82, passage 83 and passage 84 is closed by the valve 80.

As described in connection with Fig. 1, the pressure in the line G is much greater than the pressure in the line D because of the spring system 62, and therefore, the pressure in chamber 85 into which duct G opens would normally tend to operate slide valve 80 to the left until the left hand end 86 of the valve engaged stop 87, and caused a block portion 88 on the valve to cut off communication between cylinder 10 and duct D, while opening communication between cylinder 10 and duct G by way of ducts 82, 83, 84 and chamber 85. This, however, is normally prevented by means of a pin 90 engaging to the left of piston portion 91 of the valve 80, and thus preventing movement of said valve to the left. Pin 90 is carried by a piston 92 having a rod 93 slidable in the fixed casing, and pressure is applied to the upper end of said piston 92 by means of the fluid from cylinder 10 and passage 30. This is normally sufficient to overcome the pressure of spring 94.

Normally, therefore, the parts are as shown in Fig. 3 with the duct D forming the main transmission line between cylinder 10 and cylinder 10', while the duct G performs its compensating function as in Fig. 1. When duct D fails, however, pressure on piston 92 is relieved, and spring 94 is enabled to lift pin 90 out of engagement with piston part 91 of valve 80, thus permitting the pressure in chamber 85, which it receives from duct G, to move the valve 80 to the left, causing piston portion 88 to disconnect cylinder 10 from duct D. At the same time, communication is established between cylinder 10 and duct G through passages 81, 82, 83, 84 and chamber 85. The valve 80 is provided with drainage channels 96 and 101 connected by a central bore 97, said channels 96 and 101 being adapted to drain through opening 98 when the slide valve 80 is at either end of its stroke.

Connection of duct G to cylinder 10 acts in the same way as the opening of valve 51 in the Fig. 1 form, and serves to connect duct G by way of the compensator mechanism F to line E.

Thus, it is apparent that failure of duct D will result in automatically connecting the duct G to the transmitting cylinder and to the receiver cylinder to establish a through-force transferring connection. The temperature compensating feature, however, is lost. On the other hand, if the duct G should fail while duct D still functions, this would not affect the operation of the main force transferring line, but would only result in the elimination of the temperature compensating feature. Upon failure of duct G, the pressure in chamber 85 would be relieved, which would enable spring 100 to move slide valve 80 to the right until it strikes the end of the chamber, at which time the piston portion 91 of the slide valve would cut off line G from passage 84, and hence from cylinder 10. We have seen that maintaining the connection of cylinder 10 to duct D effective, and to duct G ineffective, depends upon maintaining pressure on the piston 92 sufficient to overcome the pressure of spring 94. However, upon synchronization at the end of a stroke of the piston 11, the pressure in the system is relieved, which would, unless measures were taken to prevent it, release the pin 90 to permit pressure from duct G in chamber 85 to operate the valve to the left, and thus cut off the main force-transferring connection through duct D. To obviate this condition there is provided a bell crank 105 pivoted on the frame at 106 and normally spring-pressed by a spiral spring 111 connected to the pivot and the bell crank so as to swing the bell crank with its arm 109 directly overlying the piston rod 93 to prevent the piston 92 and the pin 90 from lifting. When the piston 11 is at the upper end of its stroke, the pin 35 engages the bell crank 34 to move the rod 33 downwardly and open the valve 31, permitting fluid from the reservoir to communicate with the fluid in cylinder 10. Such downward movement of rod 33 does not affect the position of bell crank 105 because a pin 107 on rod 33 is free to ride downwardly within a slide 108 formed in the bell crank. When the piston 11 approaches the lower end of its stroke, a pin 36 engages the bell crank 34 to lift rod 33, and hence, lift pin 107 to cause the bell crank 105 to rock in a clockwise direction around its pivot 106 to permit arm 109 to move off the end of piston rod 93 and thus free the piston 92 and pin 90. If the pressure in the duct D by reason of failure of duct D, or excessive leakage has fallen sufficiently to permit spring 94 to lift piston 92 and pin 90 so that the valve 80 is released, connection will be made between cylinder 10 and duct G. If, however, the pressure in line D has not failed, piston 92 will be held downwardly so that when piston 11 is lifted again, the bell crank 105 will rock in a counter-clockwise direction to permit arm 109 to lock the piston rod 93 against upward movement. A stop 110 limits the counter-clockwise movement of the bell crank.

Similarly, after duct D fails and duct G becomes effective, the slide valve 80 is moved to the left against the action of spring 100, and is held there by the pin 90 engaging the right hand end of the slide valve 80. The pin is moved down as the pressure builds up again (after D has failed) by the pressure supplied from duct G. The pin is held down by the action of the bell crank 105 except when the piston 11 approaches the lower end of cylinder 10.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a hydraulic remote control system, in combination, a transmitting station, a receiving station, a main force transferring connection between said stations, an auxiliary force transferring connection between said stations normally disconnected at both ends from said stations, means responsive to breaking of said main connection, and means actuated by said responsive means for connecting said auxiliary connection to said stations.

2. In a hydraulic remote control system, in combination, a transmitting station, a receiving station, a main hydraulic force transferring connection between said stations, an auxiliary force transferring connection between said stations normally disconnected at both ends from said stations, and means for disconnecting said main connection and connecting said auxiliary connection to said stations, said last-named means comprising manually operated means at one end of said auxiliary connection, means responsive to breaking of said main connection, and means at the other end of said auxiliary connection adapted to be actuated by said responsive means.

3. In a hydraulic remote control system, in combination, a transmitting station, a receiving station, a main hydraulic force transferring connection between said stations, including a variable volume chamber, an auxiliary hydraulic connection connected to said chamber and normally disconnected from said stations, means responsive to expansion and contraction of the fluid in said auxiliary connection for varying the volume of said chamber in a direction to compensate for variations in fluid volume in said main connection, and means for disconnecting said main connection and connecting said auxiliary connection to said stations.

4. In a hydraulic remote control system, in combination, a transmitting station, a receiving station, a main hydraulic force transferring connection between said stations, including a variable volume chamber, an auxiliary hydraulic connection connected to said chamber and normally disconnected from said stations, means responsive to expansion and contraction of the fluid in said auxiliary connection for varying the volume of said chamber in a direction to compensate for variations in fluid volume in said main connection, and means for connecting said auxiliary connection to said stations when said main connection is broken.

5. In a hydraulic remote control system, in combination, a transmitting station, a receiving station, a main hydraulic force transferring connection between said stations, including a variable volume chamber, an auxiliary hydraulic connection connected to said chamber and normally disconnected from said stations, means responsive to expansion and contraction of the fluid in said auxiliary connection for varying the volume of said chamber in a direction to compensate for variations in fluid volume in said main connection, and means actuated by the breaking of said main connection for connecting said auxiliary connection to said stations.

6. In a hydraulic remote control system, in combination, a transmitting station, a receiving station, a main hydraulic force transferring connection between said stations, including a variable volume chamber, an auxiliary hydraulic connection connected to said chamber and normally disconnected from said stations, means responsive to expansion and contraction of the fluid in said auxiliary connection for varying the volume of said chamber in a direction to compensate for variations in fluid volume in said main connection, and means for disconnecting said main connection and connecting said auxiliary connection to said stations, said last named means comprising manually operated means at one end of said auxiliary connection, and means at the other end of said auxiliary connection adapted to be actuated by the breaking of said main connection.

7. In a hydraulic remote control system, in combination, a transmitting station, a receiving station, a main hydraulic force transferring connection between said stations, including a variable volume chamber, an auxiliary hydraulic connection connected to said chamber and normally disconnected from said stations, means responsive to expansion and contraction of the fluid in said auxiliary connection for varying the volume of said chamber in a direction to compensate for variations in fluid volume in said main connection, and means for disconnecting said main connection and connecting said auxiliary connection to said stations, said last named means comprising manually operated means at one end of said auxiliary connection, and means at the other end of said auxiliary connection adapted to be actuated by the operation of said manually operated means.

8. In a hydraulic remote control system, in combination, a transmitting station, a receiving station, a main hydraulic force transferring connection between said stations, including a variable volume chamber, an auxiliary hydraulic connection connected to said chamber and normally disconnected from said stations, means responsive to expansion and contraction of the fluid in said auxiliary connection for varying the volume of said chamber in a direction to compensate for variations in fluid volume in said main connection, and means for disconnecting said main connection and connecting said auxiliary connection to said stations, said last named means comprising means adapted to be actuated by the breaking of said main connection for connecting one end of said auxiliary connection by way of said chamber, and manually operated means for connecting the other end of said auxiliary connection.

9. In a hydraulic remote control system, in combination, a transmitting station, a receiving station, a main hydraulic force transferring connection between said stations, including a variable volume chamber, an auxiliary hydraulic connection connected to said chamber and normally disconnected from said stations, means responsive to expansion and contraction of the fluid in said auxiliary connection for varying the volume of said chamber in a direction to compensate for variations in fluid volume in said main connection, a second main force transferring connection between said stations, and means for connecting said last-named connection to said stations when said auxiliary connection is disconnected from said stations.

CARL G. HEBEL.
ROBERT H. WALLACE.

REFERENCES CITED

The following references are of record in the file of this patent:

UNITED STATES PATENTS

| Number | Name | Date |
| --- | --- | --- |
| 1,987,435 | Engel | Jan. 8, 1935 |
| 2,107,111 | Etchison | Feb. 1, 1938 |
| 2,186,235 | Brown | Jan. 9, 1940 |
| 2,344,768 | Dodson | Mar. 21, 1944 |